INVENTOR
FLORENS J. von DELDEN
BY
*Marechal, Biebel, French & Bugg*
ATTORNEYS

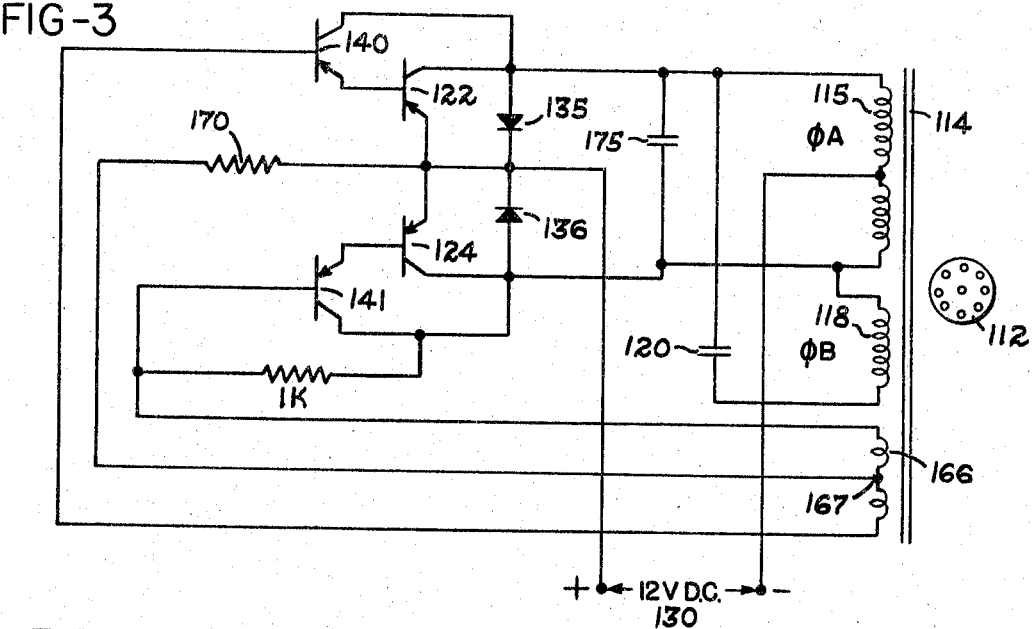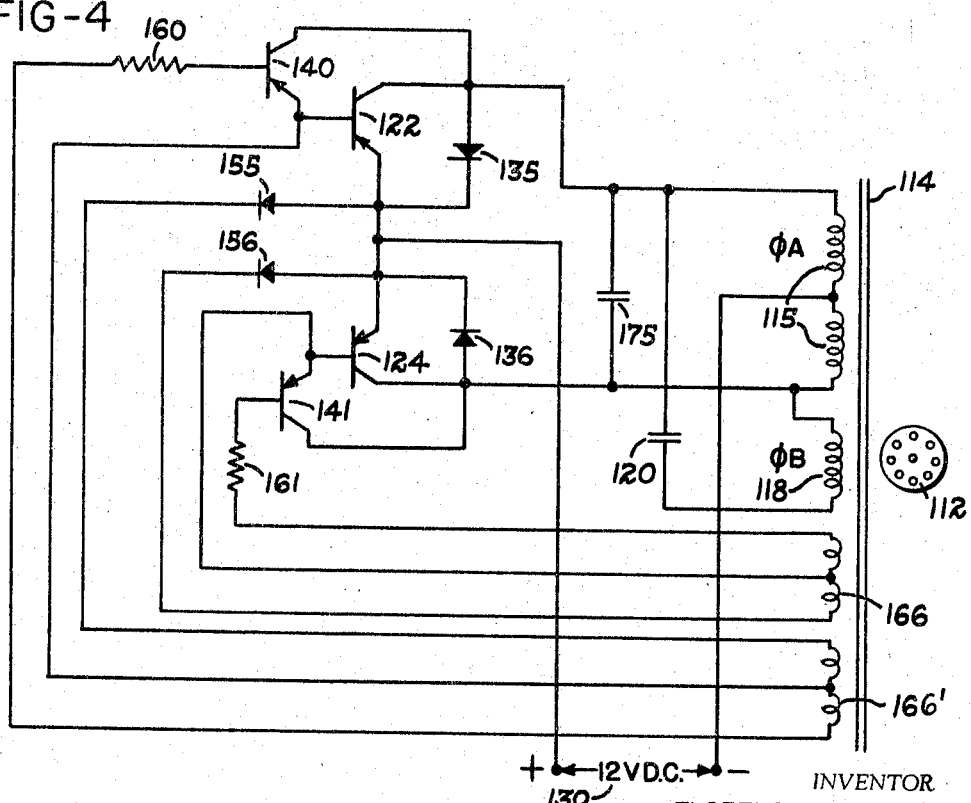

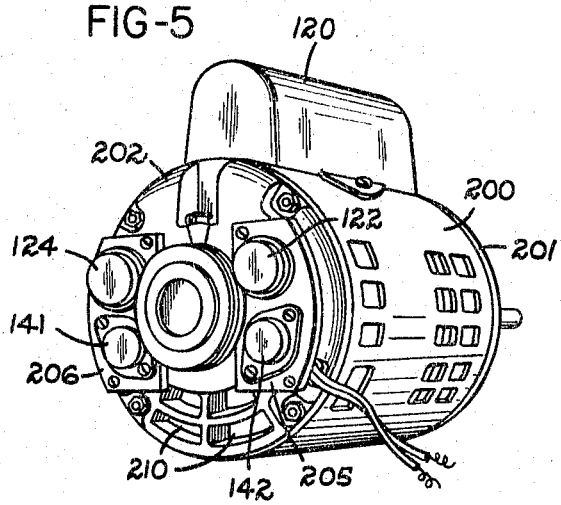
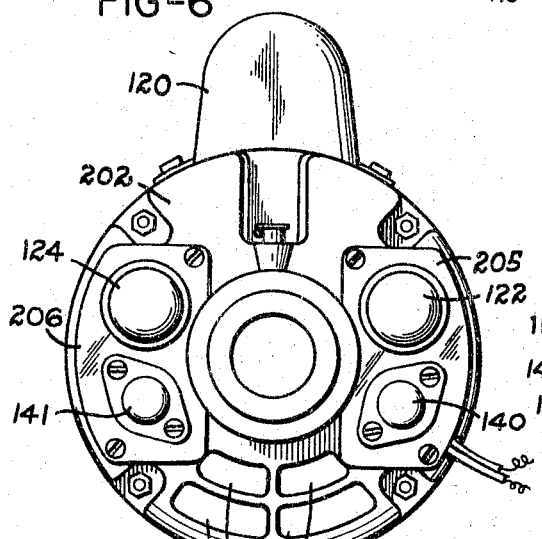
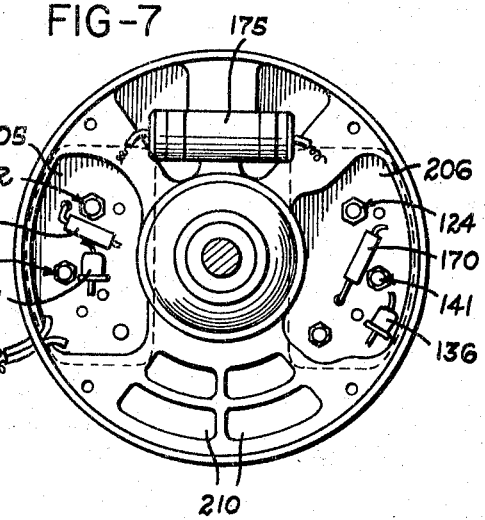
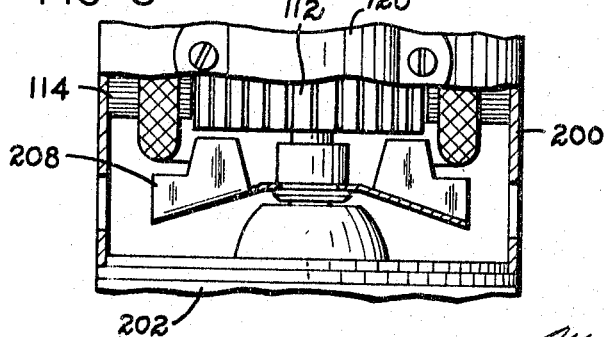

United States Patent Office 3,324,368
Patented June 6, 1967

3,324,368
TRANSISTORIZED ELECTRIC INDUCTION MOTORS AND CIRCUITS FOR OPERATION ON DIRECT CURRENT
Florens J. von Delden, Glendale, Calif., assignor to The Lau Blower Company, Dayton, Ohio, a corporation of Ohio
Filed Sept. 4, 1964, Ser. No. 394,468
17 Claims. (Cl. 318—138)

This invention relates to electric motors and more particularly to induction motors and circuits for operating induction motors from a source of direct current power.

Requirements have existed for electric motors which operate directly from sources of DC power, characterized by long service life, good speed regulation, freedom from commutation noise, carbon dust, and having an acceptable efficiency. Various attempts have been made to use induction motors on low-voltage, DC motors for this purpose to eliminate these difficulties and others associated with commutator type motors. Induction motors which have operated on low voltage direct current have usually required the use of separate frequency and voltage converting apparatus to provide alternating current at specified voltages and frequencies to ordinary induction motors to obtain desired rotor speeds and torque. These devices have had the disadvantage of excessive weight and expense for the power output, often had low overall efficiency, and were usually suitable for use with only a particular set of operating conditions.

The induction motors of this invention operate on the two-phase principle, and are formed with stator windings which are tailored to the frequency of oscillation required to provide the desired motor speed. Also, the motors of this invention employ a high input impedance switching circuit. This circuit is also characterized by relatively high gain and asures starting of the motor and rapid acceleration to its design speed under all normally anticipated operating temperatures and under load. The teachings of this invention are applicable to induction motors over a wide range of sizes and speeds, and apply equally to subfractional and fractional horsepower motors as well as the larger integral motors, with rotor speeds ranging from only a few r.p.m. up to and in excess of 20,000 r.p.m.

The circuit design is particularly adapted for incorporation into the motor structure, resulting in wholly integrated direct current induction motors which have only a pair of energizing leads, and which are directly comparable both in physical dimensions and electromechanical requirements, with commutator type DC motors. In many instances, motors constructed according to this invention are directly interchangeable with commutator DC motors, resulting in substantial improvements in length of trouble free operation without attention or replacement over commonly used commutator motors.

One form of an integrated motor which may be constructed according to this invention includes the mounting of many, if not all, of the electrical components of the switching circuit on one of the end bells of the motor. This arrangement permits the cooling of these electrical components directly by the usual motor cooling fan which is mounted internally of the motor on the motor shaft. Standard commonly produced induction motors are particularly adapted for this purpose since the space which would normally be occupied by the starting switch can be occupied by electrical wiring components carried on one of the end bells, and cooled by the internal fan. This arrangement usually does not increase either the diameter or the overall length of the motor over that which is characteristic of the standard induction motor.

One of the primary objects of this invention is the provision of an induction motor and DC drive circuit suitable for use with a wide range of outputs and speeds, including subfractional, fractional and larger integral motor applications.

A further object of this invention is to provide a transistorized DC drive circuit for operating a two-phase induction motor directly from a source of low voltage direct current.

A further object of this invention is the provision of a control circuit for a two-phase induction motor utilizing a feedback or drive transformer for controlling the frequency of the converter circuit, and the motor speed, in relation to the degree of saturation of the motor core.

A still further object of this invention is the provision of an induction motor and control circuit for DC operation in which power output transistors are driven by a high impedance input circuit giving reliable starting under conditions of low leakage losses and low temperature.

Another object of this invention is the provision of a two-phase motor operable either from a source of low voltage DC power, or low voltage AC sine wave power.

Another object of this invention is the provision of a two-phase induction motor for operation on a low voltage drive circuit having a capacitor connected between the phase windings for shifting the phase of the current between the windings by series tuning and improving the power factor of the motor.

A further object of this invention is the provision of an induction motor having a phase A winding which is center tapped and a non-center tapped phase B winding which is connected to the phase A winding through a phase shifting capacitor, which windings are driven by a single phase inverter circuit from a source of DC power.

A still further object of this invention is the provision of an inverter circuit for driving an induction motor from a source of DC power which has a square hysteresis loop feedback transformer for controlling the switching of a high impedance input circuit according to the saturation of the stator core which, in turn, controls a relatively low impedance transistor inverter for switching the windings of the induction motor.

A further object of this invention is to provide an induction motor in which the electrical components of the inverter circuit are mounted on an end bell of the motor and which thus provides a heat sink for the transistors and permits cooling by the motor fan.

These and other objects and advantages of the invention will be apparent from the following description, the accompanying drawings and the appended claims.

In the drawings:

FIG. 3 is a wiring diagram of a further embodiment of this invention;

FIG. 4 is a slightly modified form of the wiring diagram of FIG. 3;

FIG. 5 illustrates certain preferred physical arrangements of parts as applied to an induction motor constructed according to the teachings of this invention;

FIG. 6 is a rear view of the motor of FIG. 5, showing the placement of the electrical parts on the end bell;

FIG. 7 is an inside elevational view of the end bell; and

FIG. 8 is a fragmentary section through the motor showing the motor rotor and the air circulating fan therein.

FIGURE 1

Figure 1:
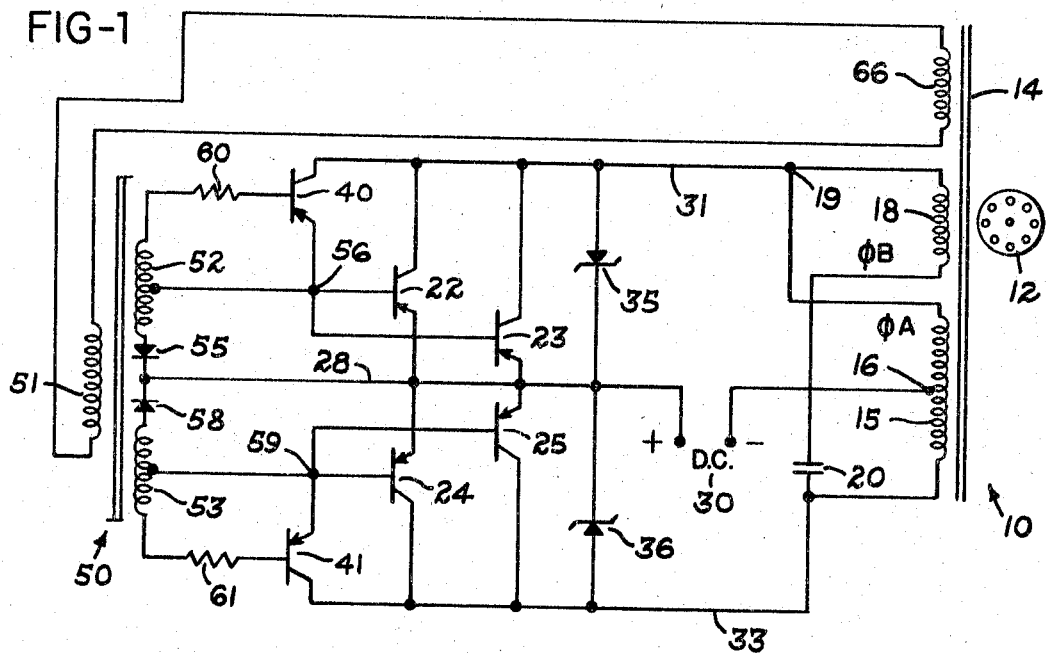
FIG. 1 is a schematic wiring diagram of a motor and control circuit constructed according to this invention.

Referring to the figures of the drawings which illustrate preferred embodiments of the invention, an AC induction motor is illustrated at 10 in FIG. 1 as having a rotor 12 and a stator 14. The induction rotor 12 may be of any configuration, as known in the art, and preferably uses copper bar inductors for low losses. The stator 14 may be formed with a suitable core of laminated silicon steel. In many instances, NEMA standardized components may be used for the stator frame and often for the rotor. The stator steel preferably has relatively low-loss characteristics so as to reduce such losses which would be caused by operation on square wave AC. A somewhat larger-than-usual rotor gap is preferably used so that the drag caused by the leakage and fringing fluxes is held to a minimum. The rotor is mounted in a suitable stator housing or frame for rotating in suitable bearings.

Phase A and phase B windings are formed on the stator 14. The phase A winding 15 is bifilar and is center tapped at 16. The phase B winding 18 is not center tapped. The phase windings 15 and 18 each have one end connected in common at 19. The other end of the phase B winding 18 is connected to the phase A winding through a phase shifting capacitor 20. The capacitor 20 forms the phase shifting means for series tuning the phase B winding 18 with respect to phase A resulting in an approximately 90° phase shift. At 90° phase shift, the motor develops the most power and the inverter draws the minimum current for the particular power output. Due to this series tuning, there is a voltage magnification at the winding 18 depending upon the "Q" factor of the circuit. Also, the voltage across phase B becomes generally a sine wave of greater magnitude than the input square wave voltage at the phase A winding, and leading it by 90°. The current in the phase B windings is substantially in phase with the voltage in the phase A windings. The capacitor 20 also improves the power factor of the circuit and thus lowers the input current at low loads.

While the relationship of the number of turns in the phase A winding to the number of turns in the phase B winding is somewhat arbitrary, there are two facts which influence the turns required for the phase B winding, and these are the frequency of operation and the size of the capacitor 20 to be used. If the motor frequency, that is the switching frequency, is low then a larger capacitor 20 will be required for phase shifting than for higher frequency motors. By increasing the phase B turns, the actual value of capacitance required to effect the desired phase shift can be reduced at the expense of working voltage across the phase. The actual number of turns, and therefore the AC voltage across phase B, is chosen so that the capacitor 20 is operating at about seventy-five percent of its rated voltage.

The value of the phase shifting capacitor should also be high enough for good starting characteristics without drawing excessive current at slip speed. While the actual capacitance may be varied within wide limits, the use of too high a capacitance will result in excessive phase B current at slip speed.

Preferably, each half of the phase A winding encompasses all of the slots of the stator core. In this manner the entire stator experiences a flux reversal at each switching period of the transistors, and no part of the stator core can become permanently magnetized, impeding oscillation of the circuit. The same arrangement also applies to the phase B winding.

Single phase drive or switching means for the phase windings of the induction motor 10 for driving the stator directly from a low voltage DC source includes push-pull power transistors, which may be connected in parallel pairs as shown. Thus, the P-N-P transistors 22 and 23 form one pair of parallel connected power transistors, while the P-N-P transistors 24 and 25 form the second pair. The primary purpose in using pairs of transistors is to avoid the significantly higher cost and slower switching speeds of the single transistors which are presently capable of handling the required current outputs. However, it is within the scope of this invention to use single transistors in lieu of the transistor pairs described herein, where such pairing is satisfactory. The transistors of each pair, when pairing is considered desirable, are preferably chosen to have comparable beta, to prevent unbalance.

All four drive transistors have their emitters connected in common at a lead 28, which also forms a common lead to one side of a DC power source 30. The collectors of the transistor pair 22 and 23 are connected in common and, through a lead 31, are connected to the common side of the phase windings at 19. In a similar manner, the collectors of the transistor pairs 24 and 25 are connected by a lead 33 to the other side of the phase A winding 15 and through the phase shift capacitor 20 to the phase B winding 18. The negative pole of the power supply 30 is connected to the phase A winding 15 at the center tap 16.

Due to the high leakage inductance which is commonly found in induction motors, means are provided to prevent destruction of the power transistors 22–25 by high transient voltages during switching. This is accomplished by Zener diodes 35 and 36. The diode 35 is connected in parallel with the emitters and collectors of the transistor pair 22–23, while the diode 36 is similarly connected in parallel with the pair 24–25. Accordingly, transients which exceed the breakdown voltage of the diodes are clipped by the diodes preventing damage to the transistors. For a 24 volt system, these diodes may have a breakdown voltage of 50–60 volts. The spike removing diodes have the further advantage of clipping voltage transients which may occur when the power is turned off to the motor. In the absence of these clipping diodes, transients at turn-off (inductive ringing) may be sufficient to destroy the switching transistors.

The circuit which has been thus far described is a low impedance switching circuit suitable for causing a single-phase, essentially square wave voltage to be applied across the phase A winding 15, inducing currents alternately in the two halves of the winding 15 and a current in the phase B winding 18, which is in phase quadrature with that of the phase A winding 15. During operation, the transistor pairs are alternately switched from conduction in the saturated mode of non-conduction. The switching of the power or drive transistors in controlled by a high impedance control circuit to be described below. The high impedance input circuit provides reliable starting and accurate frequency control.

Power transistors are notoriously low in impedances, and this can be a source of difficulty in starting the switching, particularly at low temperatures, where the inherent leakage currents are low. Transistor gain also drops with temperature. At such temperatures, such as −10 to −40° C., the low leakage current, and low transistor gain may not be sufficient to start oscillation in the absence of the high gain, direct-connected input circuit of this invention.

The invention thus includes high impedance drive means for the power transistors which assure motor start under cold conditions. This includes a P-N-P driving transistor 40 which has its emitter direct-connected to the bases of the transistors 22 and 23, and a similar P-N-P driving transistor 41 which is also direct-connected to the bases of the transistors 24 and 25. The collector of the drive transistors 40 is connected to lead 31 in common with the collector of the respective transistors which it controls. Similarly, the collector of transistor 41 is connected to lead 38. The direct connection of the drive transistors 40 and 41 to control the bases of the power transistors forms a control circuit which is characterized by relatively high gain and reliable starting at low temperatures, and rapid acceleration to speed, as well as controlled frequency of switching. Reference may be had to the patent to Darlington 2,663,806 of Dec. 22, 1953, for a more detailed description of the high input impedance drive circuit.

Figure 2:
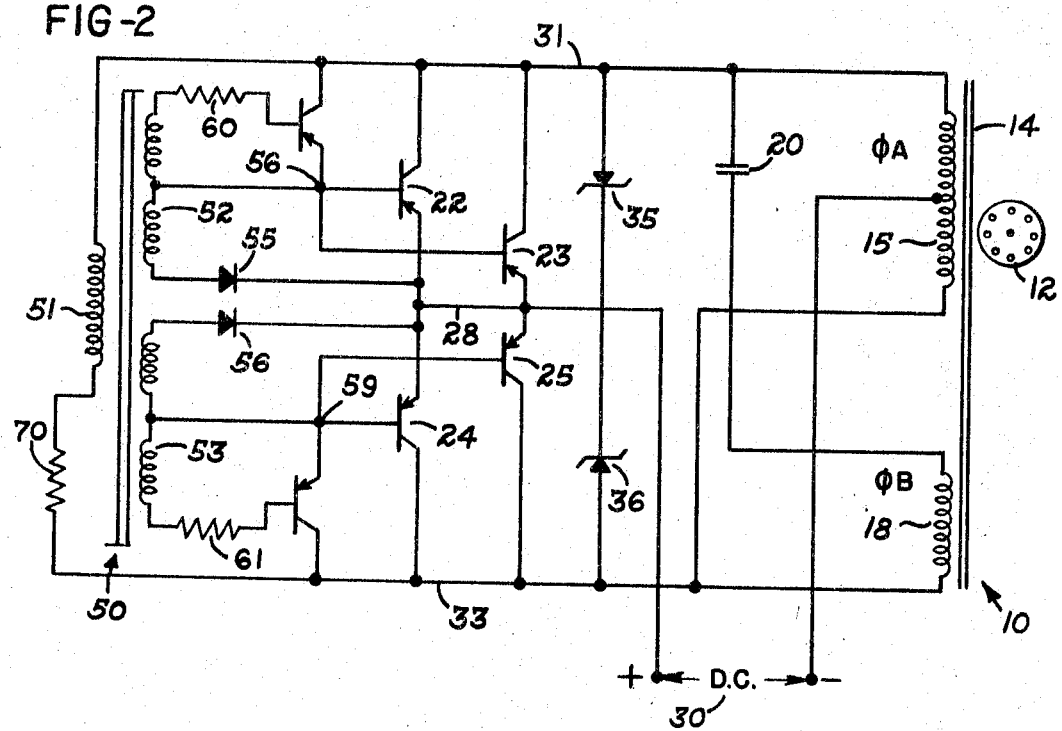
FIG. 2 is a slightly modified form of the wiring diagram of FIG. 1.

The switching of the transistors 40 and 41 of the embodiments of FIGS. 1 and 2 is controlled by means of a toroidal feedback transformer 50 which has a core characterized by a square-loop hysteresis curve. The transformer 50 has a primary winding 51 and center tapped isolated secondary windings 52 and 53. The center tapped winding 52 is connected through a biasing diode 55 between the base of the transistor 40 and the common lead 28. The center tap is connected to a junction point 56 which is common to the emitter of the control transistor 40 and the bases of the drive transistor pair 22 and 23. Similarly, the center tapped control winding 53 is connected to the base of the transistor 41 and through another biasing diode 58 to the common lead 28. The center tap is similarly connected at 59 to a point common to the emitter of the control transistor 41 and the bases of the drive transistor pair 24 and 25. The center tap connections at 55 and 59 of the respective control windings 52 and 53 have the effect of providing additional positive control current to the emitters of the drive transistors 40 and 41.

The diodes 55 and 58 between the transformer windings 52 and 53 achieve a back biasing voltage on the output transistors during the off cycle so that no collector current flows during cut off. A current limiting resistor 60 is connected in series with the winding 52 and the base of transistor 40. A similar resistor 61 is connected between the winding 53 and the transistor 41.

The primary winding 51 of the frequency control transformer is connected to be responsive to changes of the flux in the stator core, to control the switching rate in timed relation to the rise and fall of the flux in the core. Thus, in this embodiment, the primary 51 is connected across a specially wound oscillator winding 66 on the stator 14. The oscillator winding 66 is preferably wound in the same stator slots in which the phase A winding 15 is wound. This eliminates to a considerable extent what could otherwise be an undesirable interaction with the flux formed by the phase B winding.

Operation

Motor speed is a function of the switching rate as governed by the following relationship:

$$N = \frac{60f}{P}$$

Where:

$N$ = Synchronous shaft speed in r.p.m.
$f$ = Switching rate in c.p.s.
$P$ = Number of pairs of poles.

In practice, N is never reached in an induction motor due to rotor slip, and therefore $$N = n + s$$

Where:

$n$ = actual induction motor shaft speed in r.p.m.
$s$ = slip in r.p.m.

In further explanation, the operation of the two-phase induction motors depends upon the abrupt change in inductive reactance of an iron cored inductor when the core reaches magnetic saturation. In the embodiment of FIGS. 1 and 2, this can be taken as the saturation of the core of the transformer 50 where the circuit is designed for this transformer to saturate prior to the saturation of the strator 14. However, in the embodiment of the motors of FIGS. 3 and 4, described below, this abrupt change occurs with the saturation of the stator core 14.

To amplify this statement further, when the core saturates there can be no further induced voltage $$\frac{Ld\phi}{dt} \rightarrow 0$$

as $\phi$ approaches 0. The actual saturation time depends on the number of turns of the coil, the magnitude of the applied DC voltage and the induction level of the core material.

The general motor equation may be written as follows:

$$V = 4.44 B a f N \times 10^{-5}$$

Where:

$V$ = applied voltage (volts)
$B$ = flux density (kilogauss)
$a$ = area of core in square centimeters
$f$ = operating frequency (c./s.)
$N$ = number of turns.

Taking a specific example and calculating the frequency at which an inductor would oscillate when connected to a pair of switching transistors such as the transistors 23 and 25:

Let $V$ = 12 v. D.C.
$B$ = 15 kilogauss
$a$ = 1 square cm.
$f$ = ?
$N$ = 100 turns $$12 = 4.44 \times 15 \times 1 \times f \times 100 \times 10^{-5}$$

$$f = \frac{12}{66.6 \times 100 \times 10^{-5}} = \frac{1200}{6} = 180 \text{ c./s.}$$

But $$f = \frac{1}{t}$$

where $t$ is the period of 1 cycle.

$$t = \frac{1 \text{ sec.}}{180} = 5.56 \text{ msec.}$$

$$\frac{t}{2} = 2.28 \text{ msec.}$$

It will therefore be seen from the above example that the core will saturate in 2.28 milliseconds. If the coil is now disconnected and reconnected in the opposite direction, such as effected by the switching transistors of this invention, the core will again saturate 2.28 milliseconds after the application of the voltage, but it will be saturated in the opposite polarity.

The above teachings are applied to the motors of this invention to provide control over the switching frequency and the rotor speed, and have resulted in motors which operate consistently at their design speeds. This is known as frequency tailoring of the stator windings.

The input to the control transformer 50 is a signal which varies in timed relation with the flux reversals in the stator as effected by the phase A winding 15. When the stator flux reaches a predetermined level, which may be at or below saturation, the oscillator winding 66 applies a signal to the primary 51 of such a polarity as to switch the conduction from one transistor drive to the other by causing the rapid and distinct saturation of the core of the transformer 50.

The control transformer 50 is employed particularly in motors which are to be operated at relatively high speeds, such as speeds in excess of 7000 r.p.m., or where relatively high switching rates are to be accurately controlled, for more precise speed regulation and accurate switching. However, the transformers 50 may be used in lower speed and higher power applications, and provide a convenient means by which the oscillating signal from the stator 14 can be amplified and applied to the high impedance input circuit. The switching transformer also provides a means for isolating the input circuit from transients which appear in the stator, and therefore contributes to the long life of the drive and switching circuits.

The conduction of the drive transistors 22–23 and 24–25 is in the saturated mode. Thus, they alternately conduct at saturation and are held at cutoff. Since a high impedance input circuit is used for the inverter, the current in the secondaries of the transformer 50 is only 1/beta times the load current where β equals the input transistor gain. The square loop characteristics of the transformer 50 core material permits rapid transistor switching with a minimum loss of power.

Since the switching rate of the two-phase induction motors of this invention is controlled by the number of turns on the stator, when a larger number of turns is employed on the stator, the frequency of switching is correspondingly reduced. The use of saturable transformer 50 provides a convenient way in which the switching point can be accurately controlled in relation to the $B-h$ curve or the flux density of the stator. The signal applied to the primary winding 51 and/or the number of turns in this primary, can be controlled to define the saturation point of the core of the transformer 50 in relation to the flux density of the stator 14. Since this core preferably has a square hysteresis loop, a clean and accurately-timed signal is applied to the high impedance input circuit. Also, the transformer 50 provides a certain degree of control over the switching frequency, and therefore over rotor speed, by providing some selection as to where the circuit will switch in relation to the degree of saturation or flux density of the stator 14. This may be affected by properly choosing the turns on the oscillator winding 66 and the primary 51 in relation to the saturation characteristics of the core. However, and primarily, the switching rate outside the limits of control which can be effected by the transformer 50, is determined at any given voltage by the number of turns in the stator.

The presence of the rotor 12 is necessary to complete the magnetic circuit and to load the stator, and all of the calculations and design considerations are based on the presence of the rotor 12 in the magnetic circuit. It has been found that totally different results are obtained when the rotor is removed, but these results are not the desired results since the only ones which have any meaning are those which are obtained with the rotor in the magnetic circuit.

The inverter circuits of this invention have a further characteristic which is of advantage. Since the frequency of oscillation is dependent, in part, upon the presence of the rotor and its electrical characteristics, it follows that the frenquency of oscillation varies with rotor speed. The oscillator switches at a lower frequency at rotor stall and increases in frequency as the speed of the motor increases. Therefore, the motors which are constructed according to this invention exhibit no pronounced pullout characteristic. A further factor which enhances the starting characteristics is that the inverter circuit, during startup, draws greater current and drives the stator further into saturation. However, it is preferred that the stator saturate before the rotor since rotor saturation may result in premature switching and reduced starting torque.

The induction motor may conveniently be reversed by reversing the "start" and "finish" taps of the phase A winding in relation to the phase B winding. The motors of this invention may be operated directly on low voltage sine wave power by applying this power directly across the winding at leads 31 and 33. In such case a higher torque is produced since all of the phase A winding is utilized at the same time.

FIGURE 2

The circuit diagram shown in FIG. 2 comprises a slightly modified form of that of FIG. 1, with similar parts being designated by corresponding reference numerals. In the embodiment of FIG. 2, the primary winding 51 of the feedback transformer 50 is connected directly across the collectors of the transistor pairs 22–23 and 24–25, through a small resistor 70. Thus, the primary 51 is effectively connected across the phase A winding. This arrangement may be preferred over the use of a separate oscillator winding 66 of the embodiment of FIG. 1 for the reason that it permits the elimination of this winding, which may be important in small motors where, at low voltages and relatively heavy phase windings, there may not be enough room in the stator slots for the oscillator winding. Further, since the transformer primary is now driven directly from the collectors of the drive transistors, rather than from a separate motor winding, there is eliminated any interference of the phase angle by the flux which is induced by the phase B winding 18. The arrangement shown in FIG. 2, provides more accurate switching and therefore a more stable speed, and for this reason, the circuit shown in FIG. 3 may be preferable in certain instances.

The operation of the embodiment shown in FIG. 2 is substantially the same as that which has been previously described in connection with FIG. 1. It is clear that there will be induced into the primary of the feedback transformer 50 a signal which is in timed relation to the current in the phase A winding 15 and the switching rate of the output transistors. The value of the resistor 70 may be varied to provide the required shift speed at load, and may, for instance, provide a speed variation in the range of 20 percent.

FIGURE 3

The embodiment shown in FIG. 3 is particularly adapted for use for higher output and/or slower r.p.m. motors, where precise switching regulation is not required. In this embodiment, the core saturation signal is utilized directly by the high impedance input circuit to the switching transistors. The parts and portions of this embodiment corresponding to parts and portions of the embodiments described in FIGS. 1 and 2 are identified by the same reference numerals plus 100. Accordingly, FIG. 3 has a rotor 112 and a stator core 114. A bifilar phase A winding 115 is formed with a center tap 116. Also, the stator is wound with a phase B winding 118, connected to the winding 115 by the phase shifting capacitor 120.

The switching circuit is shown in this embodiment as including a single pair of switching power transistors 122 and 124 which control the application of a DC source 130 to the stator windings, in the manner which has been described above.

High impedance input means for controlling the switching transistors 122 and 124 includes the transistors 140 and 141 which are direct connected, respectively, to control the transistors 122 and 124, as has been described above in connection with FIGS. 1 and 2. However, the bases of these transistors are connected directly to a center tapped oscillator winding 166. The center tap 167 of the winding 166 is connected to the common lead 128 through a bias control resistor 170, which corresponds in function to the resistor 70 in FIG. 2.

In addition to the Zener diodes 135 and 136, a capacitor 175 is connected across the phase A winding at the output of the switching transistors for spike and transient removal.

In the operation of this embodiment, saturation of the core 114 by conduction of one of the transistors 122 or 124 results in a reversal of current in the oscillator winding 166 and accordingly a reversal of conduction of the control transistors 140 and 141. These, in turn, result in the switching of the output or switching transistors 122 and 124. Start up is assured by inherent unbalances within the system and by the relatively high gain afforded by the input circuit which amplifies these unbalances to effect full conduction first in one direction and then in the other, and so on, for immediate starting of the motor.

The switching frequency and therefore the rotor speed of a given motor constructed according to this embodiment is again dependent upon the number of turns in the primary. The circuit of FIG. 3 is particularly adapted for four and six-pole motors, although the teachings may be applied equally to two-pole motors.

In the motor circuit of FIGS. 3 and 4, in the absence of a switching transformer 50, the frequency of oscillation will decrease with decreasing rotor speed so that the pullout point is substantially reduced. This is a generally desirable characteristic as the decrease in switching with decreasing rotor speed means that the rotor is somewhat compensating as to slip and therefore has a relatively flat torque curve.

With the relatively larger motors which are preferably constructed according to the teachings of FIGS. 3 and 4, an increase in capacitance of the phase shifting capacitor 120 will result in the motor running at a slower speed and will act somewhat as a dynamic brake.

FIGURE 4

The embodiment of FIG. 4 is quite smiliar to that of FIG. 3 and differs primarily in the arrangement of the oscillator coils and their respective connection to the high impedance input circuit. In this embodiment, the oscillator coils 166 and 166′ are separately wound, and are thus electrically isolated. These coils may be considered as analogous to the isolated secondary windings on the transfomer 50 in the embodiments of FIGS. 1 and 2, and thus employ isolation diodes 155 and 156 for back biasing the transistors during the off mode. This circuit may, in some instaances, be preferred over the circuits shown in FIG. 3 since it has been found to have better characteristics with regard to freedom of transient voltages. Again, each of the oscillator windings 166 and 166′ are preferably wound in the slots of the phase A winding.

The folowing examples are illustrative only, and represent some of the motors which have been made according to the teachings of this invention. It is, however, to be understood that these examples are illustrative only, and that the teachings of the invention are not to be limited thereto.

Example I

A 2-pole motor was wound using a Robbins & Myers frame No. KP–F26 and a one inch stack of M–15 steel. The stack was formed with 16 slots, and a phase A winding was wound with a 1 to 7 throw. The phase A winding consisted of 3 turns, 8-in-hand of No. 20 wire. An oscillator winding was wound in the slots of the phase A winding and consisted of 4 turns of No. 22 wire.

A phase B winding was wound with a 1 to 7 throw and consisted of 10 turns of a single No. 20 wire. A phase shifting capacitor of 88 microfarads was used.

The drive circuit was constructed according to the teachings of FIG. 1 and included a transformer 50 which had a toroidal core part No. 50094–2A of Magnetics, Inc. The primary winding 51 included 80 turns and the secondary windings each included 24 turns. The primary drive or switching transistors were Delco type 2N1520, and Motorola transistors type 2N57 were used in the high impedance input circuit.

The motor which was constructed according to this example delivered 1/16 horsepower at 16,500 r.p.m. on 12–14 v. DC when connected to a high speed blower load. The motor started readily and came quickly to its operating speed under load.

Example II

A 2-pole motor was wound using a Robbins & Myers frame part No. KP–F26 and 1½ inch stack of M–15 steel. The stator included 16 slots and the phase A winding consisted of 3 turns, 8-in-hand, of No. 20 wire wound with a 1 to 7 throw. No oscillator windings were used.

The phase B winding consisted of 10 turns, 2-in-hand, of No. 22 wire wound with a 1 to 7 throw, and connected to the phase A winding through a 180 microfarad phase shifting capacitor.

A drive circuit was constructed according to the teachings of FIG. 2 and included components similar to those which have been detailed in connection with Example I. This motor operated from a twelve volt supply under a blower load and delivered 1/15 horsepower at 10,000 r.p.m. For these figures, the resistor 70 was chosen at 150 ohms, and the resistors 60 and 61 in the base circuits of the transistors 40 and 41 were each 0.1 ohm. Zener diodes 1N2823 were used for the diodes 35 and 36.

Example III

A 6-pole, 2-phase, induction motor was wound in a NEMA 48 frame on a 1¾ inch stator stack having 36 slots. The phase A winding consisted of 6 turns, 4-in-hand, of No. 20 wire with a 1 to 5 throw. The oscillator windings were wound in the phase A slots and consisted of 8 turns, 2-in-hand, of No. 22 wire.

The phase B winding consisted of 14 turns, 2-in-hand, of No. 22 wire and was connected to the phase A winding through a 180 microfarad phase shifting capacitor.

The drive circuit was constructed according to the teachings of FIG. 3, and employed a 10 microfarad spike removing capacitor 175. The power switching transistors 122 and 124 were type 2N1520, while the high impedance input circuit included transistors types 2N1535. The resistors in the center tap of the oscillator winding 166 was of relatively low value and could be varied between a low value of approximately one ohm up to at least 100 ohms for speed selection.

The motor of this example exhibited no pull out characteristics and could be operated between 200 and 900 r.p.m. on 12 v. D.C. It turned a 30 inch 5 bladed fan, 27° pitch at 200 r.p.m. and gave a measured 72 inch ounce of torque at 390 to 400 r.p.m. The motor could be operated at these speeds and loads continuously without over heating.

Example IV

A 2-pole motor was constructed using a Robbins & Myers type L–330 frame, with a stator stack of 2¼ inches. This frame was formed with 18 slots, and the phase A winding was wound with a 1 to 7 throw, and consisted of 8 turns, 6-in-hand, of No. 22 wire. The oscillator winding consisted of 4 turns, 4-in-hand, of No. 24 wire wound in the phase A slots.

The phase B winding consisted of 10 turns, 2-in-hand, of No. 22 wire and was wound with a 1 to 8 throw. A 180 microfarad phase shifting capacitor was used.

A drive circuit was constructed according to FIG. 4 using switching transistors 2N1520, although type 2N2157 were optional for low temperature operation. The high impedance drive circuit used transistors 2N1535, while the current limiting resistors in the base circuit were chosen at 3 ohms.

This motor, when connected to a 14 inch fan, delivered 40 inch ounces of torque at 1750 r.p.m.

Example V

A 4-pole integral motor which was wound on a standard NEMA No. 48 frame having a 3½ inch stack. The stack was formed with 24 slots, and the phase A winding was wound with a 1 to 5 throw consisting of 2 turns, 14-in-hand, of No. 19 wire. The oscillator windings consisted of 2 turns, 4-in-hand, of No. 22 wire.

The phase B winding was also wound with a 1 to 5 throw and consisted of 4 turns, 4-in-hand, of No. 20 wire. A phase shifting capacitor of 180 microfarads was used. No capacitor was needed for starting.

A drive circuit was constructed according to the teachings of FIG. 4, with power transistors suitable for carrying the required current load, and included parallel-connected DA3F3 transistors, 4 each being used as electrical substitutions for each of the transistors 122 and 124 of FIG. 4. The high impedance drive circuit included a pair of transistor types 2N57, with 10 ohms in the base circuits.

This motor delivered ½ horsepower at a load speed of 1650 r.p.m. and had a no-load speed of 2200 r.p.m. It started readily under load and accelerated rapidly to its load speed.

The motors and inverter drive circuits of this invention are particularly adapted for use with commonly available motor hardware and parts. In FIG. 5 there is illustrated an induction motor which may, for instance, have a No. 48 NEMA frame 200. The motor is shown as having a front housing or end bell 201 and a rear end bell or housing 202 which closes the open ends of the frame and which rotatably supports a rotor. In this specific embodiment, the electrical components of the motor are described using the same reference numerals as those which have been applied and described in connection with FIGS. 3 and 4.

The rear end bell 202 is commonly provided with one or more access covers, and in this embodiment, the bell 202 is shown as having a pair of oppositely positioned access covers 205 and 206. Normally, one of these covers provides access to an electrical terminal strip within the motor frame and the other may commonly support a thermal cutout switch. Since the motor shown is a two-phase motor the terminal strip and the associated centrifugal start switch are eliminated, thus providing an open space between the interior of the cover 202 and the internal motor components in which electrical motor components may be received.

The induction motor commonly includes a cooling fan 208 which may be located at either end of the rotor 112. Preferably, this fan is located adjacent the rear end cover 202 which supports the electrical components to be cooled. As shown, the power switching transistors 122 and 124 are each mounted on one of the covers 205 and 206 and are paired with the associated drive transistors 140 and 141. If desired, these covers may be replaced by covers formed of suitable heat sink material, such as aluminum. It is also within the scope of this invention to apply the transistors and other components directly to the end bell of the motor.

Preferably, the drive transistors 140 and 141 are also mounted on the heat sink material, comprising the covers 205 and 206. The terminal ends of the transistors project inwardly into the interior of the cover and are thus accessible from within the bell housing. However, it is within the scope of this invention to reverse this arrangement and mount the transistors from within on the inside of the end bell 202.

Reference may be had to FIG. 7 for a suggested arrangement of some of the additional electrical components, it being understood that the arrangement shown is suggestive only, and a wide variety of arrangements of physical displacement on the end housing 202 will suggest themselves to one skilled in the art. For the sake of simplicity, the actual wiring connections have generally been omitted, and reference may be had to FIG. 3 for the actual electrical connections used.

The advantage of this arrangement is that air which is drawn by the fan 208 through the air inlet openings 210 formed in the end cover also cools the electrical components of the motor. This mounting arrangement does not increase the overall diameter of the frame 200, and it usually does not increase the overall length of the motor. Accordingly, a motor which is constructed according to this invention may be used as direct substitute in installations which have been designed for commonly available commercial sizes.

It is therefore seen that this invention provides induction motors which have frequency tailored stator windings and which have high input impedance transistor switching circuits to provide reliable and predictable operation directly from low voltage, direct current sources. The teachings of this invention are applicable to a wide variety of design applications, such as exemplified by the examples which have been given. It is understood that the invention is not limited to these examples.

While the forms of apparatus herein described constitute preferred embodiments of the invention, it is to be understood that the invention is not limited to these precise forms and to the examples which have been given for the purpose of illustration, and that changes may be made therein without departing from the scope of the invention as defined in the appended claims.

What is claimed is:

1. An induction motor for operation directly from a low voltage source of DC power comprising a stator having a center tapped phase A winding wound thereon and also having a phase B winding wound thereon, said phase A and phase B windings each having one end connected in common, a phase shifting capacitor connecting the other end of said phase B winding to the other end of phase A winding providing a series tuning relationship of said phase B winding with respect to phase A winding, to receive power from said phase A winding, said phase shifting capacitor having a capacitance sufficient to effect an approximately 90° phase shift in the current in said phase B winding as compared to the current in said phase A winding, a transistor switching circuit connected in push-pull relation to said phase A winding to effect conduction alternately in each half of said phase A winding resulting in the impression thereon of substantially square wave current and resulting in substantially a sine wave current in said phase B winding through said capacitor, said switching circuit including at least a pair of power transistors connected to effect said alternate conduction, and a pair of electrically isolated oscillating windings on said stator each connected to control the conduction and cutoff of one of said transistors in response to the saturation of said stator.

2. The motor of claim 1 further comprising a pair of Zener diodes connected across said power transistors to remove harmful voltage spikes which develop across said phase A windings.

3. A two-phase induction motor for operating directly from a source of direct current power, comprising a stator having a center tapped phase A winding and a phase B winding wound thereon, an oscillator winding on said stator wound in the slots of said phase A winding, phase shifting means connecting said phase B winding to said phase A winding, and a switching circuit for said stator windings including at least one pair of relatively low impedance power transistors having a common connection to the phase A center tap and connected in push-pull relation to said phase windings, a high impedance transistor input circuit including a further pair of high impedance transistors having their emitter-collector circuit connected directly to the bases of said power transistors to drive said push-pull transistor circuit, and circuit means connecting said oscillator winding to control the switching rate of said high impedance input transistors in response to the saturation of said stator by said transistor switching means.

4. The motor of claim 3 further comprising a pair of Zener diodes connected across said power transistors to remove harmful voltage spikes which develop across said phase A windings.

5. The induction motor of claim 3 further including an end bell, a rotor supported for relation in said end bell, and means supporting said power transistors directly on said end bell providing a heat sink therefor.

6. The motor of claim 5 further comprising an air circulating fan mounted for rotation with said rotor inwardly of said end bell for inducing air flow of said transistors.

7. The induction motor of claim 5 wherein said end bell includes terminal access covers and wherein said transistors of said inverter circuit are mounted on said access covers.

8. The induction motor of claim 5 wherein said access covers are formed of a heat sink material.

9. A two-phase induction motor having an induction rotor and a stator and a circuit for operating directly from a source of direct current comprising a center tapped first phase winding on said stator, a second phase winding on said stator, a phase shifting capacitor connecting said first and second windings, a drive circuit for said windings including push-pull power transistors connected across said windings and having a common junction point, a source of DC power connected between said transistor common junction point and the center tap of the first phase winding, and high impedance drive means for said push-pull power transistors including a pair of control transistors direct connected to the bases of said push-pull transistors, and means connecting the bases of said control transistors and responsive to the rate of flux reversals in the stator for controlling the switching rates of said power transistors, including a saturable coupling transformer having a primary connected to respond to the flux conditions in said stator and a secondary connected to control said control transistors with a switching rate corresponding to the occurrences of saturation of said stator.

10. The induction motor of claim 9 in which the primary of said transformer is connected directly across said phase A windings.

11. The induction motor of claim 9 further comprising an oscillator winding on said stator, said transformer primary being connected to said oscillator winding.

12. An induction motor having an induction rotor and a stator and a circuit for operating directly from a source of direct current comprising a center tapped winding on said stator, a drive circuit for said winding including push-pull transistors connected across said winding and having a common junction point, a source of DC power connected between the common junction point and the center tap of said winding, and drive means for said push-pull transistors including a feedback toroidal transformer having a primary connected to be responsive to changes in flux in said stator, and a high impedance input circuit for said push-pull transistors including a pair of drive transistors direct connected to control the bases of said push-pull transistors, and means connecting the secondary of said control transformer to control the bases of said drive transistors for controlling the switching rates thereof in accordance with the flux changes in said stator.

13. An induction motor for operation directly from a source of DC power comprising a stator having a center tapped winding formed thereon, transistor drive means for said stator including at least one power transistor connected to one lead of said stator winding and another power transistor connected to the other lead of said stator winding for alternately effecting conduction in each half of said winding, means connecting the DC source between said center tap and a point common to each of said power transistors, a high impedance drive circuit for said power transistors including a pair of control transistors each of which have their emitter-collector circuits directly connected to the bases of one of said power transistors and forming a high impedance control circuit for assuring starting of switching under low temperature and low leakage current conditions, and control means for said control transistors including a feedback winding connected to each of said control transistor bases to effect switching thereof, and means connecting said winding to be responsive to the flux in said motor stator for effecting switching of said control circuit in timed relation with flux reversals in said stator.

14. The motor of claim 13 wherein said feedback winding is wound in the slots of said stator.

15. A two-phase induction motor for operating directly from a source of direct current power, comprising a stator having a phase A winding and a phase B winding wound thereon, phase shifting means connecting said phase B winding to said phase A winding, a switching circuit for said stator winding including transistor switchng means connected in push-pull relation to said phase windings, a high impedance transistor input circuit connecting to drive said push-pull switching circuit, a frequency control feedback transformer having generally square loop hysteresis characteristics, said transformer having a secondary connected to said high impedance transistor input circuit to control the switching rate of said circuit in accordance with a signal applied to said transformer, and means connecting the primary of said transformer directly across the phase A windings to receive a signal in timed relation to the switching rate of said transistor switching means.

16. A two-phase induction motor for operation directly from a source of low voltage DC power having a predetermined rotor speed comprising a rotor, a stator, a phase A winding on said stator encompassing all of the slots of said stator and being center tapped for conduction alternately through each half thereof, a phase B winding on said stator having a greater number of turns than said phase A winding and being formed continuously without a center tap, a phase-shifting capacitor, means connecting one lead of said phase A winding in common with one lead of said phase B winding, means connecting said capacitor between the other leads of said phase A and phase B windings, a pair of switching transistors connected respectively at the opposite ends of said stator phase A winding for effecting periodic reversals of current therethrough and having a common connection to said center tap, high impedance drive means for said transistors responsive to the changes of flux in said stator for effecting the switching of said transistors to conduct alternately substantially with the rate of periodic saturation of said stator core material effected by said phase A winding, the number of turns in said phase A winding being correlated with the voltage from said source to provide a volt-second characteristic resulting in the attainment of a saturating flux density in said stator at a predetermined rate dependent upon the presence of the rotor providing said predetermined rotor speed which is substantially independent of the number of turns in said phase B winding.

17. The conduction motor of claim 16 wherein said flux responsive means includes an oscillator winding on said stator wound in the slots of said phase A winding.

References Cited
UNITED STATES PATENTS

| | | | |
|---|---|---|---|
| 2,786,972 | 3/1957 | Dreier et al. | 318—16 |
| 2,814,769 | 11/1957 | Williams | 318—341 X |
| 3,083,326 | 3/1963 | Deming et al. | 318—138 |
| 3,090,897 | 5/1963 | Hammann | 318—138 |
| 3,098,958 | 7/1963 | Katz | 318—138 |
| 3,171,072 | 2/1964 | Adair | 318—254 X |

ORIS L. RADER, *Primary Examiner.*

G. Z. RUBINSON, *Assistant Examiner.*